United States Patent Office 3,062,623
Patented Nov. 6, 1962

3,062,623
REAGENT FOR THE DETERMINATION OF FAT IN BLOOD SERUM
Philip Schain, 126 Silver Lake Road, Staten Island 1, N.Y.
No Drawing. Filed Oct. 13, 1958, Ser. No. 766,695
4 Claims. (Cl. 23—230)

This invention relates to a method and reagent for separating fat, particularly for the purpose of fat determination in organic substances such as dairy products, food products, organic tissues, feces and the like, and more particularly to a method for the determination of fat in blood serums.

This application is a continuation-in-part of my copending application Serial No. 723,655, filed March 25, 1958, now abandoned, which in turn is a continuation-in-part of Serial No. 485,360, filed January 31, 1955, now abandoned, which in turn is a continuation-in-part of Serial No. 190,437, filed October 16, 1950, now U.S. Patent 2,863,734, dated December 9, 1958, which in turn is a continuation-in-part of Serial No. 64,854, filed December 11, 1948, now abandoned.

Heretofore in the determination of fat in blood serum an extraction method such as the Bloor test or one of its modifications is used. These types of test have serious drawbacks. The Bloor test requires the use of a hazardous inflammable chemical, namely, ether, and involves a hazardous operation in heating in the presence of this highly inflammable substance. It also requires use of an accurate chemical balance by trained personnel. Furthermore, the extraction methods and modified techniques involve manipulations beyond the ability of untrained technicians. Also, considerably expensive other laboratory equipment is needed to obtain any fairly accurate readings.

It is one object of my invention to provide a method of separating fat from fat emulsions containing non-fat material, especially non-fat material of a proteinaceous nature using certain chemical compounds which permit the ready separation of the fat from the emulsion.

It is another object of my invention to provide a fat determination method, free of prior disadvantages, i.e., not requiring the use of hazardous reagents and elaborate or costly equipment to obtain results according to my method.

It is a further object of my invention to provide a method that is simple, rapid and accurate in separating and determining the fat content in serum and other fat containing organic substances.

It is an additional object of my invention to provide a method capable of being carried out without requiring specialized technical training, i.e., one which can readily be used by the layman.

A further object of my invention is to provide a method which is so safe that it can be used in even a doctor's private office or other places where water and heat besides certain chemicals are available.

Another object of my invention is to provide organic chemicals having a high molecular weight, high surface active and detergent characteristics for separating fats from their emulsions or suspensions.

A more specific object of my invention is to provide one or more high molecular weight non-ionic or anionic compounds or combination of non-ionic and anionic compounds for readily separating fats from their surrounding environment.

Other objects and advantages of my invention will be apparent to those skilled in the art from the following disclosure.

In my copending application, Serial No. 190,437, I have disclosed that the emulsified fat in food products, such as milk can be demulsified and collected in a layer for measurement with the aid of a high molecular weight organic surface active agent having detergent properties and consisting of two or more surface-active materials, one belonging to the class of non-ionic and the other to the class of anionic surface-active agents. The preferred agents there disclosed are respectively a non-ionic surface active agent such as polyoxyethylene sorbitan monolaurate, which is sold under the generic trade name "Tween," and an anionic surface active agent such as dioctyl sodium phosphate, which is sold under the generic trade name "Tergitol." In that application it is further disclosed that my method must be standardized for each type of product tested depending on fat content and other properties, and an example is given of suitable conditions for testing milk.

The method disclosed in my parent case which method is followed herein and consists in adding the detergent composition in measured quantity to a measured quantity of the liquid product, warming the mixture to allow separation of a fat layer in a measuring flask and then adding any fat immiscible liquid to displace the layer of fat into the graduated neck of the flask for purposes of measuring the volume thereof.

According to the preferred procedure set forth in the present application, while any single detergent substance as hereinafter disclosed will effect fat separation, it was preferred to use a combination of detergent substances as generally mentioned above, and to add them to the serum sample to be tested as a single reagent. These substances could also be added in admixture which required ageing when an ester type of detergent such as Tween 21 was used.

In my novel method, ordinary types of apparatus can be used including the Babcock skim milk flask. However, I have provided a flask and method of using the same for stratifying a sample of liquid or mixed liquid solid or liquid gas mixture which is susceptible of separation into miscible layers. This flask is described and shown in my copending application Ser. No. 190,437, filed October 16, 1950, now Patent No. 2,863,734, and is highly useful in connection with the presently described invention.

The detergents used according to the present invention are to act in themselves to selectively perform two distinct functions separately.

The first is to selectively solubilize the lecithin protein layer surrounding the fat globules in the emulsion such as serum and thus destabilize the emulsion so that the globules may be free under the influence of gravity and heat to form a measurable layer at the surface.

The second is to selectively dissolve the particulate material surrounding the fat globules so that they may be free under the influence of heat and gravity to form a measurable layer at the surface.

In non-ionic detergents the maximum and minimum quantities that can be used are dependent primarily on the percentage of active ingredient and its consequent fat-solubilizing characteristic.

For example, assuming that 1.0 ml. of a particular non-ionic detergent is sufficient to separate all of the fat from the serum. If the concentration of this agent is increased twice by purification or other means, only ½ ml. of the agent would then be needed. However, if 1.0 ml. of this more concentrated agent were to be used, fat would still be satisfactorily separated, except that some of the separated fat would be dissolved because of the excess of detergent. If 2 ml. of the concentrated detergent were used, it might dissolve all of the fat in serum, so that there would be no measurable layer of separated fat.

For practical purposes, it could be said that in the test as now formulated and with the present size of Babcock skim milk container, as little as 0.1 ml. to as much as 2 ml. of non-ionic detergent could be used depending upon the concentration of active ingredient in the particular detergent.

In the case of the anionic detergent which primarily clarifies the protein around the fat rather than separating the fat directly from the protein, the regular Tergitol P28, for example, is normally made in a 25 percent concentration of active ingredient, the balance being ethylene glycol (which is a solvent for the active material), water and ethoxy triglycol, the latter keeping the solution of active ingredient miscible with water. New P28 which is concentrated and now being made for the Schain test contains 50 percent of active ingredient with little or no ethoxy trigylcol and no water. In this test, this new P28 is needed in only ½ the quantity as the old P28 to clarify the protein. Ethoxy trigylcol must then be separately added, however, to provide a proportion of at least 50% by volume, based on the volume of anionic detergent. The ethoxy trigylcol serves to solubilize the anionic detergent in aqueous medium.

In my parent case, it was stated that a deviation table was needed for each class of product tested (milk, cream, ice-cream, etc.) because of the wide range of fat present in such products; for example, from 1 percent to 8 percent in milk, it was necessary to compensate for the fat-solubilizing or fat-additive characteristics of the detergents. The method had to be standardized for the particular class of milk product being tested, by comparison with the ether extraction method, in which preliminary trials in this standardization procedure determined the deviation table, the approximate amount of reagent to use, approximate time and temperature of heating and the like. In the present instance for blood serum, however, a deviation table is unnecessary in general usage because the average maximum range of fat does not exceed 2 percent and for practical purposes a slight deviation in the extremities of this range is insignificant. The reagent is prepared to give exact results with the Bloor ether extraction method at 1.5 percent with the result that at 0.5 percent or 2.5 percent the deviation is no greater than the deviation of the graduated neck of the Babcock flask for measuring the fat content.

If the time of boiling is lengthened and/or if the mixture of reagent and serum is shaken or centrifuged etc. to force the fat up through the non-clear medium, there will be no deviation at all even in the higher ranges and the method will permit usage of even less detergent to about one-fourth that now used.

I found it especially advantageous in using my reagent to bring it into contact with the fat-containing emulsion being treated without substantial mechanical agitation so that the reagent or reagents and the liquid undergoing the test stratify in two layers. The relative specific gravities of the two phases are preferably adjusted so as to differ by not more than 0.0075, the reagent layer usually being the heavier. On heating such a two-layer system, from the bottom to hasten the physico-chemical reaction, portions of the heavier lower layer are circulated in particulate form through the upper layer and, on being there cooled, returned to the lower layer.

The advantage of this, as compared with immediate agitation and blending of the layers, is that the reagent remains in concentrated form for a considerable time, thus more effectively performing its function and forming the desired end product.

For purposes of treating blood serum, feces and the like a preferred range of specific gravity of my reagent layer is 1.018 to 1.086 at room temperature.

As examples of non-ionic surface-active agents effective to destabilize fat emulsions in blood serum, feces and the like, I have found the following products suitable:

Tetradecyldesoxypolyethylene glycol ("T D 750")
Polyoxyethylene sorbitan monolaurate ("Tween 20")
Polyoxyethylene sorbitan monolaurate ("Tween 21")
Polyoxyethylene sorbitan monopalmitate ("Tween 40")
Alkylarylpolyethoxy ethanol (Triton X–100)
Alkylphenoxypolyethoxy ethanol (Triton X–155)
Iso-octylphenoxyethoxy ethanol (Triton A–20)
Alkyl phenyl polyethylene glycol ethers As examples of anionic surface-active agents found effective per se to solubilize the non-fat dispersed material in the products tested to free the fat from the product and thus to clarify the menstruum and permit rapid coalescence of the fat globules, I have found the following products suitable:

Dioctyl sodium phosphate
Sodium tetradecyl sulfate
Triethanolamine tetradecyl sulfate
Sodium octyl sulfate
Diamyl sodium sulfosuccinate
Diisobutyl sodium sulfosuccinate
Sodium lauryl sulfate These agents range between 10 to 20 percent in concentration.

In addition to its use for analytical purposes, my method may be used on a large scale for separating fat from fat emulsions for the preparation of fat products. For example, the same method and reagents which are used for extracting and then measuring the fat may be used for extraction alone with the additional steps of decanting the extracted fat and washing it by passage through water to remove traces of the reagent.

In applying my method I have found it desirable in many cases to use the non-ionic agent in solution in alcohol, such as methyl, ethyl, propyl, butyl, octyl and trimethylnonanol.

My method thus comprises broadly, the separation of fat emulsified in a fluid material which contains other dispersed material by adding to the material to be tested, under conditions appropriate to the material, a non-ionic surface-active agent to separate or destabilize the fat from non-fat protein per se or an anionic surface-active agent having the properties described above, allowing the agents to act on the material, and permitting the liberated fat globules to coalesce and stratify. Both these surface-active agents are used in far higher percentages than is usual when they are used for detergent or like purposes, and under such conditions would not give any analytical values. For example, when testing for fat in serum or feces the non-ionic agent is preferably used in an amount in the approximate range 5–25 volume percent of the serum, and the anionic agent in the approximate range 50–400 volume percent of the serum.

I have further discovered that it is possible to prepare a single combined reagent, containing both the non-ionic and anionic surface-active agents, which may be most effectively and preferably used in my method, and my invention also includes such combined reagent.

The following preferred example of my method is intended to be illustrative only and not to limit the scope of my invention, which is defined in the appended claims.

*Example*

Eight ml. of a non-ionic surface-active agent, alkyl phenyl polyethylene glycol ether, dissolved in 12 ml. of octyl alcohol or trimethylnonanol is added to 160 ml. of dioctyl sodium phosphate to which latter had been added 80 ml. of ethoxy triglycol to render the dioctyl sodium phosphate miscible in aqueous medium. To this is added 10 ml. of a 1 to 2000 dilution of a fat dye, Oil Red O in one of the alcohols such as methyl or in acetone; and to the whole (270 ml.), is added an equal amount of normal physiological saline (0.9 percent NaCl). This mixture is stable and accordingly may be made up in large amount. It has been found that commercial surface active agents of this type are not of strictly constant composition for analytical use, and accordingly each batch so made should be standardized by trial on representative samples against the Bloor extraction method or similar standardized methods. This present mixture described is suitable for the analysis of serum having an approximate fat range of from 0.5 percent to about 2.5 percent. The proportions however, can be varied for the analysis of other types of fat-containing material such as feces which latter contains up to about 10 percent or more in the range of 1:1 to 1:20 of non-ionic to anionic reagent by volume, depending upon the character of the material to be tested.

In carrying out a test with this reagent, 2 ml. of serum having a fat content of not higher than 2.5 percent is accurately measured into a Babcock skim milk flask to which is then added 20 ml. of the reagent, the reagent being run down the outer neck of the flask with a few gentle swirlings of the flask to wash the serum from the sides, but without substantial mixing. The flask is then placed in boiling water for 10 minutes after which the flask is removed and normal physiological saline at room temperature is added with a minimum of disturbance to the contents of the flask until the separated red layer of fat is entirely within the graduated neck of the flask. The volume of the layer is then read in the usual manner. In using this method it is unnecessary to read the fat layer at 60° C., as is the usual custom with other methods, since the presence of a small amount of the surface tension depressant in the fat keeps it liquid even when the temperature falls to room temperature.

In carrying out the invention according to my method, it will be noted that in the case of solids, such as feces and the like, in which the fat content is to be determined or the fat extracted therefrom, such material is initially prepared by means of grinding, powdering or other suitable process, before applying my method.

While preferred methods and compositions for the extraction or determination of fat in organic substances have been described herein, it is to be understood that many modifications, as to procedure and use of materials, may be made without departing from the spirit and scope of the invention.

I claim:

1. A test reagent for extractive determination of fat in blood serum consisting essentially of an aqueous solution of (1) a non-ionic surface active agent selected from the group consisting of tetradecyldesoxypolyethylene glycol, polyoxyethylene sorbitan monolaurate, polyoxyethylene sorbitan monopalmitate, alkarylpolyethoxy ethanol, alkylphenoxypolyethoxy ethanol, isooctylphenoxyethoxy ethanol, and alkyl phenyl polyethyleneglycol ether, (2) an anionic surface active agent selected from the group consisting of dioctyl sodium phosphate, sodium tetradecyl sulfate, triethanolamine tetradecyl sulfate, sodium octyl sulfate, diamyl sodium sulfosuccinate, diisobutyl sodium sulfosuccinate, and sodium lauryl sulfate, and (3) as an agent to render the anionic surface active agent miscible in aqueous medium ethoxy triglycol in an amount by volume equivalent to at least 50% of the volume of said anionic surface active agent, and the ratio of the surface active agents being within the range of 1:1 to 1:20 of non-ionic to anionic by volume.

2. A test reagent for extractive determination of fat in blood serum as defined in claim 1, wherein said solution further contains sodium chloride and an alcohol selected from the group consisting of methyl, ethyl, propyl, butyl, octyl and trimethylnonyl alcohols in amounts to provide in said solution a specific gravity in the range of 1.018 to 1.068.

3. A test reagent for extractive determination of fat in blood serum consisting essentially of an aqueous solution of alkyl phenyl polyethylene glycol ether, dioctyl sodium phosphate and as an agent to render said phosphate miscible in aqueous medium ethoxy triglycol in an amount by volume equivalent to at least 50% of the volume of said dioctyl sodium phosphate, and the ratio of alkyl phenyl polyethylene glycol ether to dioctyl sodium phosphate being within the range of 1:1 to 1:20 by volume.

4. A test reagent for extractive determination of fat in blood serum as defined in claim 3, wherein said solution further contains sodium chloride and an alcohol selected from the group consisting of methyl, ethyl, propyl, butyl, octyl, and trimethylnonyl alcohols in amounts to provide in said solution a specific gravity in the range of 1.018 to 1.068.

References Cited in the file of this patent

UNITED STATES PATENTS

| 1,853,414 | Gunther | Apr. 12, 1932 |
| 2,360,135 | Hull | Oct. 10, 1944 |
| 2,380,166 | Griffin | July 10, 1945 |
| 2,519,747 | Du Bois | Aug. 22, 1950 |
| 2,525,702 | Mattikow | Oct. 10, 1950 |
| 2,544,725 | Rider | Mar. 13, 1951 |
| 2,863,734 | Schain | Dec. 9, 1958 |

OTHER REFERENCES

"Spans and Tweens," Hercules Powder Co., 1945, pp. 2 and 3.

Schain: Science, vol. 110, July 29, 1949, pp. 121–2.

Gershenfeld: Milk and Food Technology, vol. 113, pp. 175–6, #3, May-June 1950.

Sager Proceed. 44th Annual Conv. of the Milk Ind. Foundation, October 1951, pages 27 to 43.